United States Patent [19]

Binder

[11] Patent Number: 5,062,195
[45] Date of Patent: Nov. 5, 1991

[54] MACHINING CENTER

[75] Inventor: Rolf Binder, Möchengladbach, Fed. Rep. of Germany

[73] Assignee: Werner und Kolb Werkzeugmaschinen GmbH, Berlin, Fed. Rep. of Germany

[21] Appl. No.: 560,610

[22] Filed: Aug. 1, 1990

[30] Foreign Application Priority Data

Aug. 2, 1989 [DE] Fed. Rep. of Germany ....... 3925568

[51] Int. Cl.⁵ .......................... B23Q 3/155; B23Q 7/00
[52] U.S. Cl. ........................................ 29/568; 29/563; 29/564
[58] Field of Search ............... 29/568, 26 A, 563, 564; 409/212

[56] References Cited

U.S. PATENT DOCUMENTS 4,635,342  1/1987  Balding .................................. 29/568
4,654,957  4/1987  Powell et al. ......................... 29/568
4,711,016 12/1987  Genschow et al. ............... 29/563 X

FOREIGN PATENT DOCUMENTS 3707318  9/1988  Fed. Rep. of Germany ........ 29/568

OTHER PUBLICATIONS

Binder et al., Fünfseitenbearbeitung von Grossteilen auf . . . , Werkstatt-Technik-Wt-Zeitschrift . . . , pp. 195–198.

Primary Examiner—Steven C. Bishop
Attorney, Agent, or Firm—Peter K. Kontler

[57] ABSTRACT

A machining center with two or more cooperating machines has a magazine for tools and a magazine for adapters in each machine. The tools and adapters are shuttled between the respective magazines and the material removing stations of the respective machines by discrete automated manipulators. In addition, the machining center has a transporting system which delivers workpieces from a further station to and thereupon from the material removing stations of the machines and which also serves to shuttle sections of magazines for tools and adapters between the respective magazines and an additional station where the sections are relieved of some or all of their contents preparatory to receiving other types of tools and/or adapters. The machining center can be utilized with advantage for the treatment of five sides of large or medium-large workpieces, such as frames of machine tools.

16 Claims, 6 Drawing Sheets

MACHINING CENTER

CROSS-REFERENCE TO RELATED CASE

The manipulators which are shown in the present case are of the type described and shown in the commonly owned copending patent application U.S. Ser. No. 560,602 filed Aug. 1, 1990 for "Manipulator for tools and tool adapters".

BACKGROUND OF THE INVENTION

The invention relates to improvements in machines or groups of machines (hereinafter called machining centers) for removal of material from large or medium-sized workpieces.

Multi-stage treatment of medium-sized or large workpieces is normally carried out in a series of discrete machines. For example, successive workpieces must be transported to and from discrete milling, drilling, turning, grinding, shaving and other machines in order to perform the respective treatments in a particular sequence. A drawback of such mode of treatment of workpieces is that each treatment requires a very long interval of time since a substantial part of the overall treatment involves the transport of untreated, partially treated and finished workpieces to and from each of a long series of discrete machine tools. Typical examples of workpieces which require a multi-stage treatment (normally including milling, drilling or boring, shaving, grinding and/or other operations) are machine tool frames, blocks for diesel engines which are used in watercraft, and other bulky parts.

A group of machines for treating five sides of workpieces is described by R. Binder and H. Hammer on pages 195–198 in No. 4 of the 1983 edition of German-language publication entitled "Werkstatt-Technik - wt - Zeitschrift für industrielle Fertigung". A drawback of such machines is that it still takes a relatively long interval of time to complete the treatment of a medium-sized or large workpiece.

OBJECTS OF THE INVENTION

An object of the invention is to provide a novel and improved machining center which is constructed and assembled in such a way that the treatment of workpieces (such as medium-sized or large workpieces) can be completed within a fraction of that time which is required to complete such treatment in heretofore known machines.

Another object of the invention is to provide a versatile machining center which can be rapidly converted for different treatment of identical workpieces or for different treatment of different workpieces.

A further object of the invention is to provide a flexible machining center which is particularly suitable for economical treatment of large or medium-large workpieces including frames of machine tools, bases or stands for diesel engines for use in watercraft and other workpieces of similar size.

An additional object of the invention is to provide an economical machining center which can turn out a relatively large number of finished workpieces per unit of time even if the workpieces are bulky and heavy and even if each workpiece requires a number of different treatments including grinding, milling, shaving, drilling, turning and/or others.

Another object of the invention is to provide the machining center with novel and improved means for transporting workpieces, tools and/or adapters to and from one or more material removing stations.

SUMMARY OF THE INVENTION

The invention is embodied in a machining center for removal of material from medium-sized and large workpieces, particularly for treating five sides of each workpiece. The improved machining center comprises a plurality of machines which complement each other or are used to replace each other, and each such machine has a material removing station (e.g., a station with at least one vertical or horizontal tool spindle), at least one at least partially mobile first magazine for material removing tools and at least one at least partially mobile second magazine for adapters. The improved machining center further comprises at least one manipulator which is operable (e.g., by the numerical controls of the respective machine) to shuttle tools and adapters between the magazines and the respective stations, and a multiple-function transporting unit for workpieces and magazines.

The machines can include at least one first machine having a substantial horizontal tool spindle and/or at least one second machine having at least one substantially vertical tool spindle.

The machining center can include a discrete manipulator for each machine.

The transporting unit preferably manipulates pallets for workpieces and for the magazines, and tracks for the pallets.

At least one machine of the improved machining center can be a portal type machine (for example, each machine having a substantially vertical tool spindle can be a portal type boring, drilling or like machine).

The first magazines are preferably adjacent the respective stations, and each such first magazine can comprise a plurality of sections which are movable relative to each other and include an outer section which is remotest from the respective station. The transporting unit preferably comprises means for transporting the remotest sections of the first magazines. The outer section of each first magazine is movable to and from positions of rest in the respective machines through first distances, and each other section of each first magazine is movable to and from a position of rest through lesser second distances.

Each second magazine can be disposed between the respective first magazine and the corresponding material removing station. Each such second magazine can comprise a plurality of containers including a foremost container and at least one additional container. Each foremost container is movable in the respective machine to and from a position of rest through a first distance, and each additional container is movable in the respective machine to and from a position of rest through a lesser second distance.

The transporting unit can be disposed in front of, behind or above the material removing stations and preferably includes a plurality of elongated guide rails, at least one carriage which is movable along the rails, and means for advancing workpieces, and sections of magazines to and from the carriage. The advancing means can be controlled by the numerical controls of the machining center.

The novel features which are considered as characteristic of the invention are set forth in particular in the appended claims. The improved machining center itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
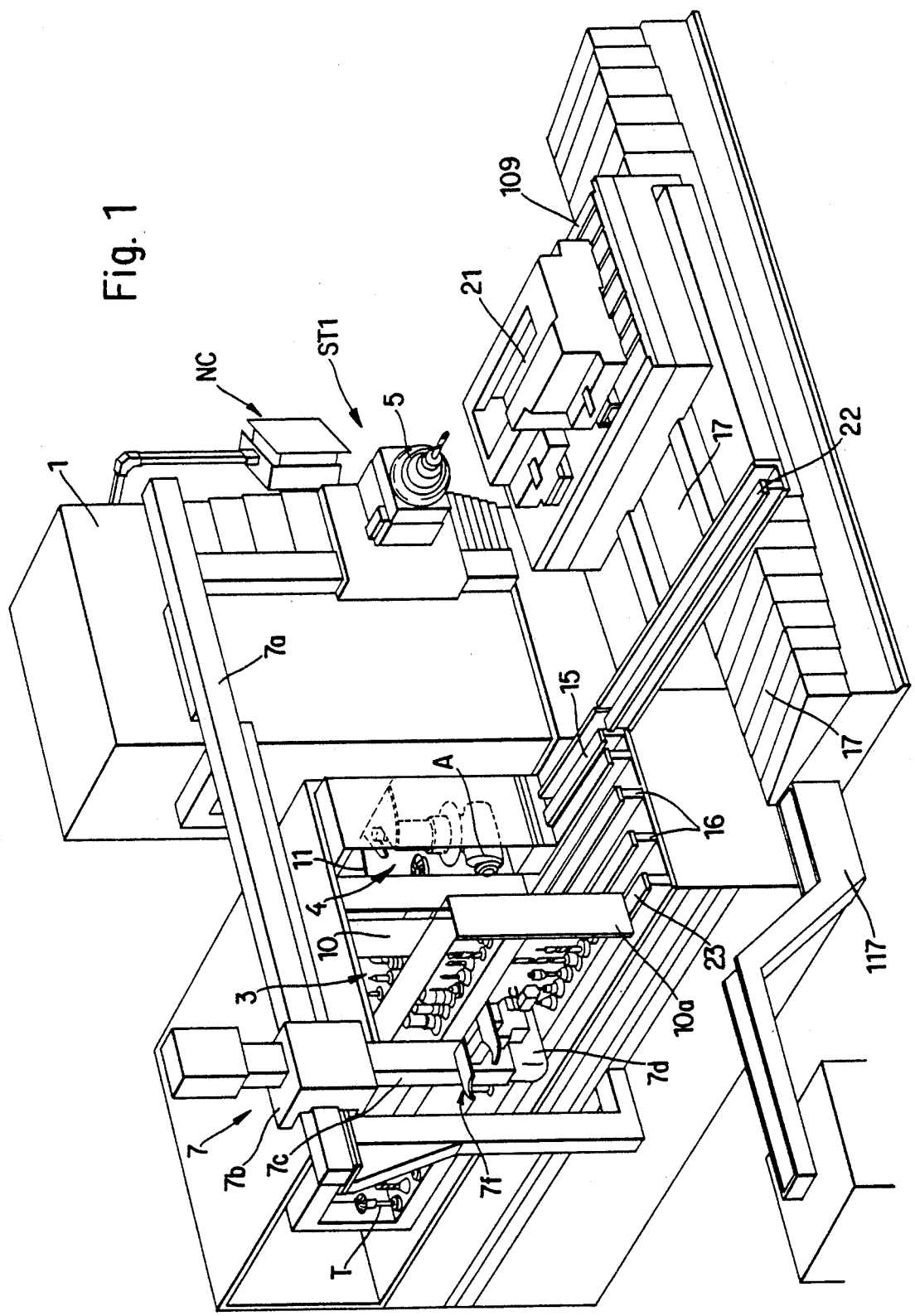
FIG. 1 is a perspective view of a first machine which can be used in the improved machining center and has a single horizontal tool spindle.
Figure 2:
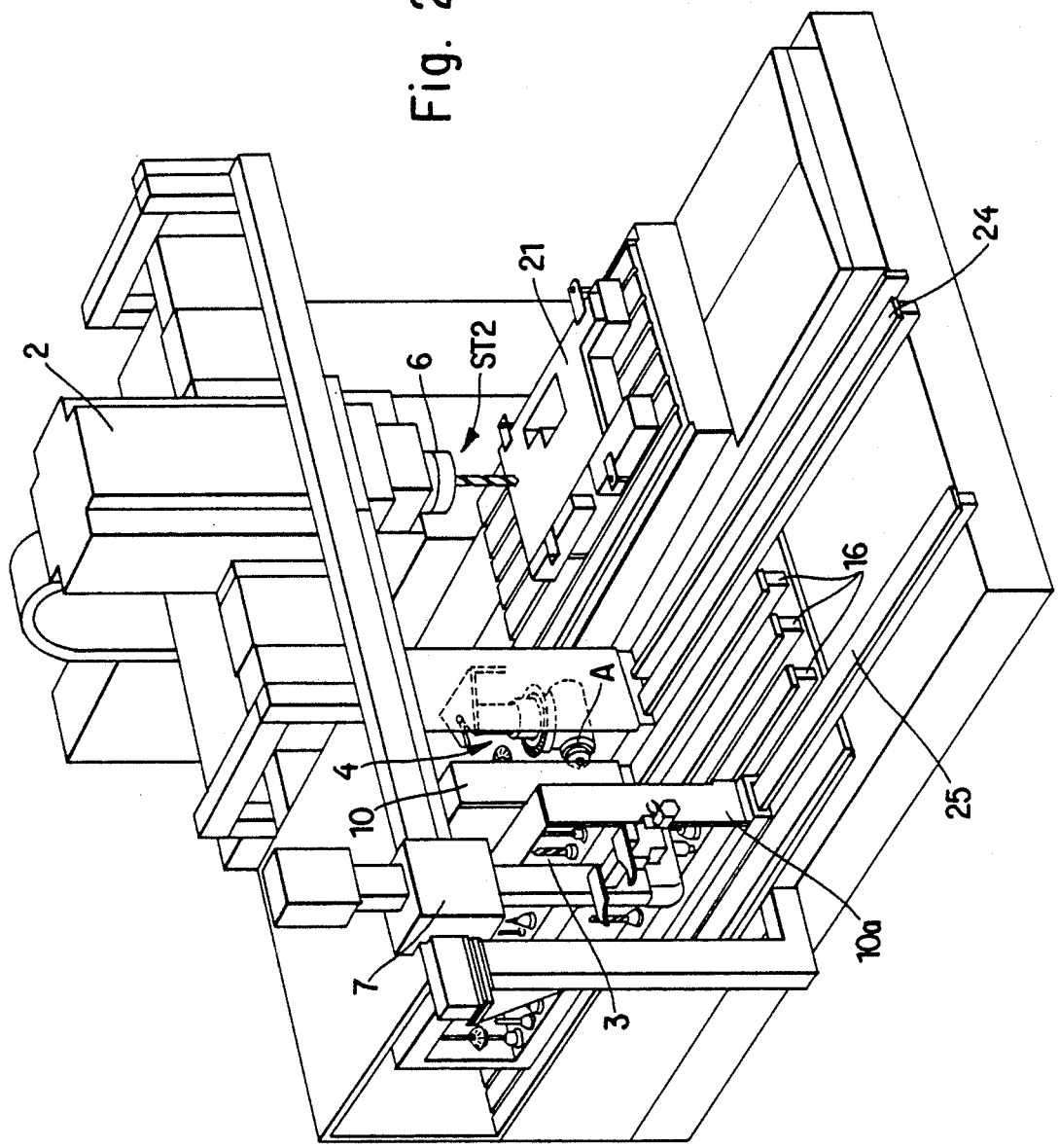
FIG. 2 is a perspective view of a second machine which can be used in the improved machining center and has a vertical tool spindle.
Figure 3:
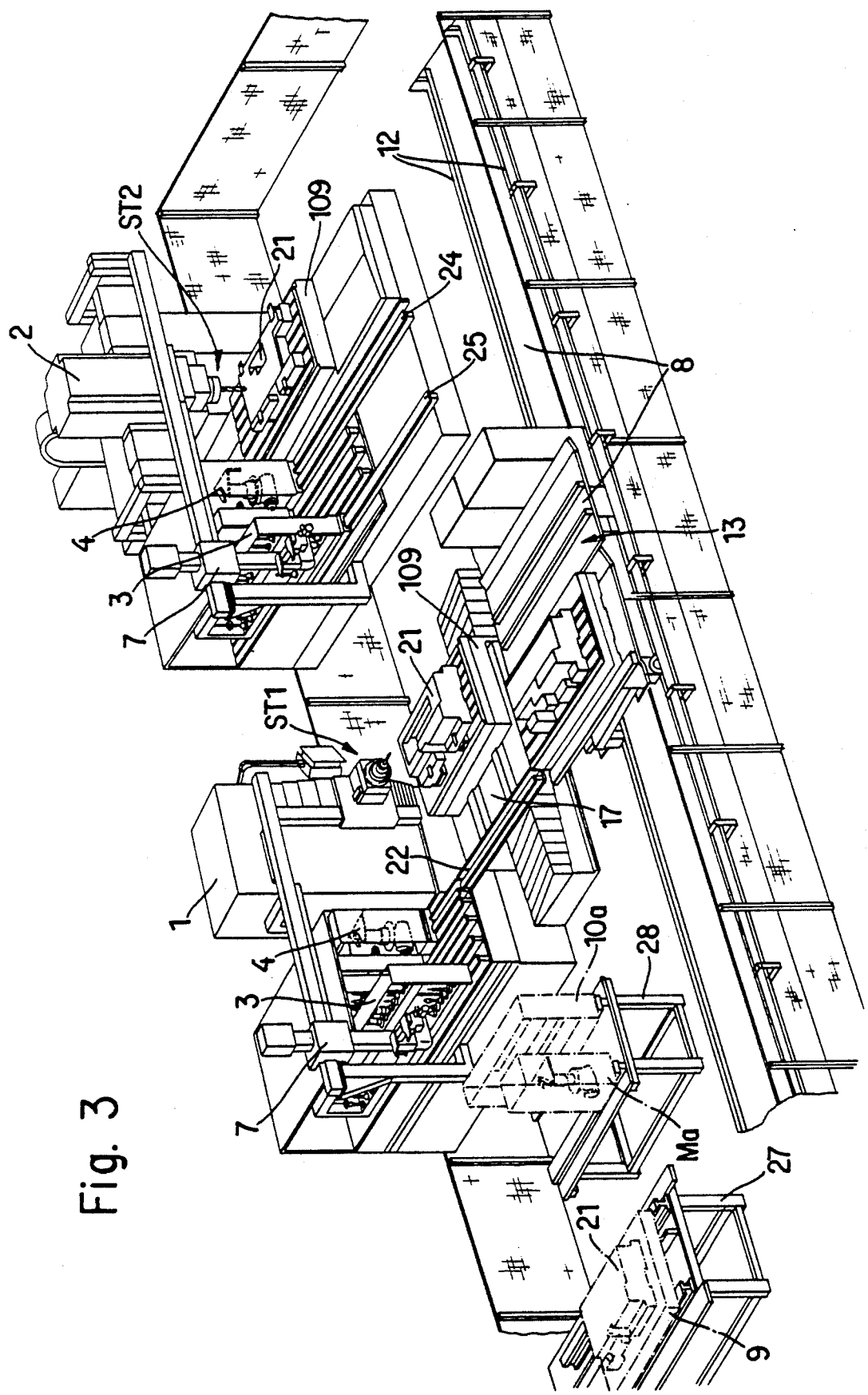
FIG. 3 is a perspective view of a machining center which embodies the machines of FIGS. 1 and 2 as well as a transporting unit for workpieces, tool magazines and adapter magazines.

FIG. 3 is a perspective view of a machining center which embodies a machine 1 of the type shown in FIG. 1 and a portal type machine 2 similar or identical to that of FIG. 2. The machine 1 of FIG. 1 has a horizontal tool spindle 5 which is located at a first material removing station ST1, and the machine 2 of FIG. 2 has a single vertical tool spindle 6 which is located at a material removing station ST2.

FIG. 1 shows that the station ST1 for the horizontal tool spindle 1 is closely adjacent a composite magazine 3 for storage of a variety of material removing tools T including drilling, milling, grinding, thread cutting and-/or other tools. The magazine 3 has several rack- or shelf-like sections 10 each of which is movable relative to the station ST1 to a desired extent. The arrangement is or can be such that the section 10a which is remotest from the station ST1 can be moved to and from a position of rest or starting (retracted) position to a first extent, and each additional section 10 is movable to and from a position or rest or starting position through a lesser second distance. The sections 10, are movable along elongated parallel horizontal guide rails 16. The outermost section 10a is movable along one or more guide rails 23.

Figure 5:
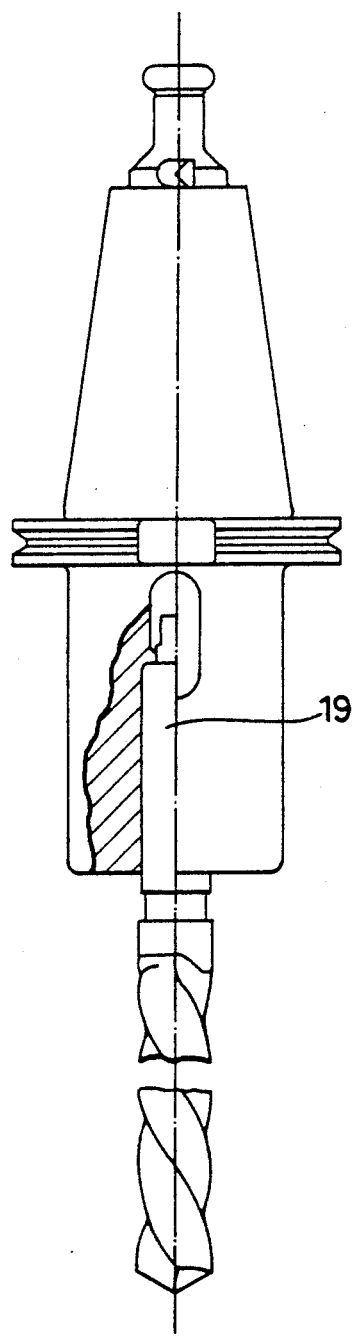
FIG. 5 is an enlarged partly elevational and partly sectional view of a drilling tool which can be used in the machining center of the present invention.

A manipulator or tool changer 7 is movable in front of the frame for the tool spindle 5 and is designed to automatically remove a selected tool T from an extended or partly extended section 10 or 10a for transport to the station ST1 or to return a tool T from the station ST1 into the respective section 10 or 10a of the tool magazine 3. The exact construction and/or mode of operation of the manipulator or tool changer 7 is or can be identical with that which is described in the commonly owned copending patent application U.S. Ser. No. 560,602 to which reference may be had, if necessary. It suffices to say that the manipulator 7 includes an elongated horizontal support in the form of a rail 7a which is affixed to the frame of the machine 1, a carrier 7b which is movable along the rail 7a, an upright holder 7c which is movable up and down with reference to the carrier 7b, a link 7d which is pivotally affixed to the lower end of the holder 7c and is turnable about a vertical axis, an arm 7e which is affixed to the free end of the link 7d and is pivotable about a horizontal axis, and two gripping devices or tongs 7f each of which has two adjustable claws or jaws which are movable in the longitudinal direction of the arm 7e. The motors which can move the carrier 7b along the rail 7a and the holder 7c up and down along the carrier 7b, the motors which can turn the link 7d relative to the holder 7c and the arm 7e relative to the link 7d, and the motors which can move the jaws of the tongs 7f along the arm 7e are controlled by the numerical controls NC of the machine 1. A tool which can be stored in the magazine 3 of FIG. 1 is shown in FIG. 5, as at 19.

Figure 6:
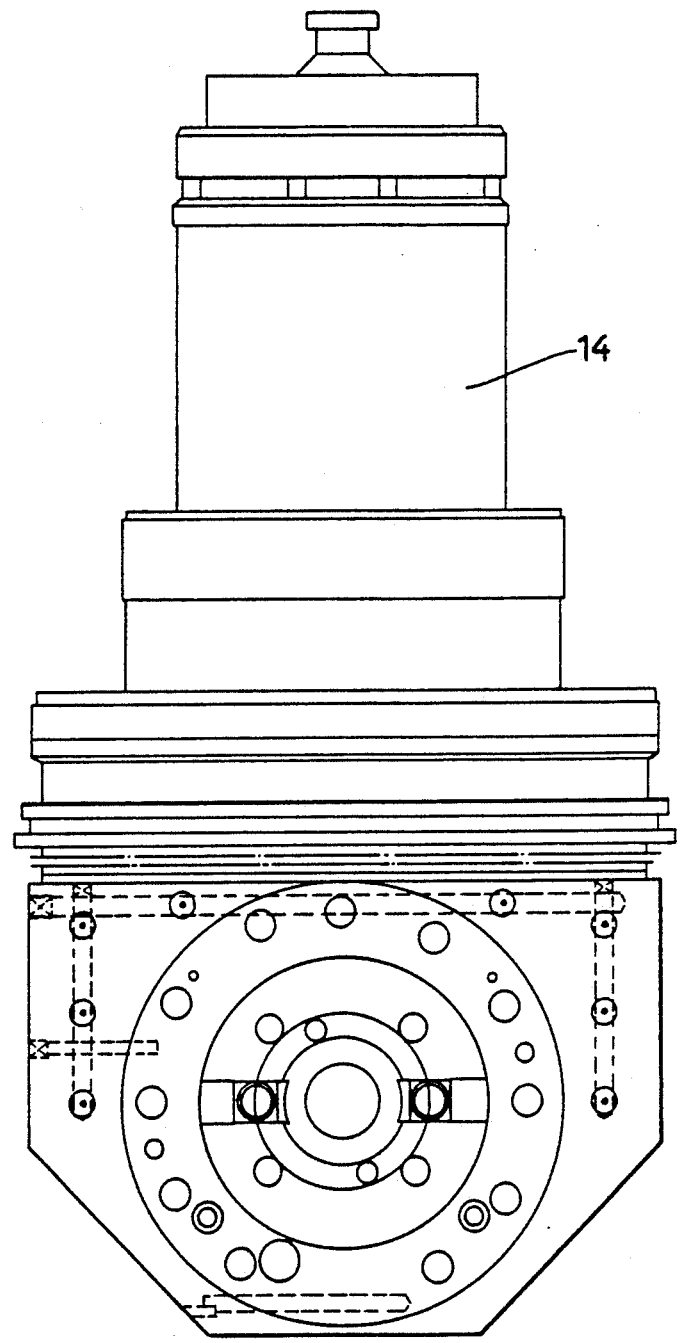
FIG. 6 is an enlarged elevational view of an adapter which can be used in the machining center of FIG. 3.

A magazine 4 for adapters A is located between the magazine 3 of FIG. 1 and the material removing station ST1. The machine 1 can comprise two or more magazines 4 and two or more magazines 3. The illustrated magazine 4 is immediately adjacent the station ST1 and includes a plurality of containers 11 for discrete adapters A. An adapter A which can be confined in one of the containers 11 is shown in FIG. 6, as at 14. The containers 11 form a row and include a foremost container and one or more additional containers behind the front container 11. The extent to which the front container 11 is movable from its position or rest (retracted position) with reference to the station ST1 exceeds the extent of movability of each additional or following container 11 to and from its position or rest or retracted position. These containers 11 are movable forwardly and backwards along one or more elongated horizontal rails 15 in front of the magazine 4 which is shown in FIG. 1.

The manipulator 7 is designed to shuttle discrete adapters A between selected containers 11 of the magazine 4 and the spindle 5 at the material removing station ST1. The two gripping devices 7f of this manipulator are angularly offset relative to each other by 180° with reference to the (horizontal) axis of rotation of the arm 7e. This manipulator can move selected tools T and selected adapters A vertically upwardly with the holder 7c, horizontally with the carrier 7b, about the vertical axis of the link 7d and/or about the horizontal axis of the arm 7e.

FIG. 3 shows a first workpiece 21 at the station ST1 and a second workpiece 21 at the station ST2. The workpiece 21 at the station ST1 is mounted on a table 17 which carries a rail 22 movable to a position of alignment with the rails 15, 16 and 23 for the containers 11 and the magazine sections 10 and 10a of the respective machines. In FIG. 1, the rail 22 on the table 17 is aligned with the rail 15 for the containers 11 of the magazine 4. The rail 22 serves to establish a logistic connection between the magazines 3 and 4 on the one hand and a transporting unit 8 on the other hand.

The machine 2 of FIG. 2 also comprises a tool magazine 3 and a magazine 4 which stores adapters A and is disposed between the magazine 3 and the material removing station ST2, preferably immediately adjacent such station. An important advantage of the portal type machine 2 is its great stability and hence a highly satisfactory reliability and accuracy which is invariably important in connection with the drilling of holes or other treatment of workpieces 21 at the station ST2. The magazines 3, 4 of the machine 2 are or can be identical or substantially identical with the similarly referenced magazines in the machine 1 of FIG. 1, and the manipulator 7 of FIG. 2 is preferably identical with the manipulator of FIG. 1.

FIG. 2 shows that, in order to establish a connection between the magazine 4 for adapters A and the transporting unit 8, the machine 2 further comprises an elongated rail 24 which replaces the rails 15, 22 of FIG. 1 and extends all the way to a location above two parallel rails 12 of the transporting unit 8. The magazine 4 of FIG. 2 comprises containers 11a for adapters A, e.g., for adapters of the type shown at 14 in FIG. 6. The rail 25 of FIG. 2 is aligned with the section 10a of the magazine 3 and its length equals or approximates that of the rail 24.

The transporting unit 8 is located in front of the material removing stations ST1 and ST2 of the machines 1 and 2 which together form or form part of the machining center of FIG. 3. The unit 8 includes the aforementioned rails 12 extending transversely of the rails 15, 16, 23, 24 and 25 in a preferably horizontal plane. The unit 8 further comprises a carriage 13 which is reciprocable along the rails 12 and can perform a number of different functions. Such functions include conveying pallets 9 for workpieces 21 from a station 27, where the workpieces 21 on the respective pallets 9 are or can be subjected to a preliminary treatment, to the station ST1 or ST2. The pallets 9 can deliver workpieces 21 (with or without preliminary treatment at the station 27) into the range of tables 109 which can transport such workpieces between the carriage 13 and the respective material removing stations ST1 and ST2. Furthermore, the carriage 13 can accept at least the outermost sections 10a of the magazines 3 for tools T after the outermost sections 10a have completed their travel toward the path of the carriage 13 on the guide rails 12. The carriage 13 can transport sections 10a to a station 28 where the tools T in such sections are replaced with different tools before the sections 10a are returned into the respective magazines 3. The outermost section 10a of the magazine 3 of FIG. 1 can be advanced along the rail 22 of the table 17 which is movable along the base or bed of the machining center along a guide rail 117.

The carriage 13 can also transport containers 11 or 11a from the magazine 4 of FIG. 1 or from the magazine 4 of FIG. 2 to the station 28 where the adapters A are replaced with different adapters before the respective compartment 11 or 11a is returned to the magazine 4 of FIG. 1 or 2. A container 11a which is to be advanced between the carriage 13 and the respective magazine 4 is caused to move along the rail 22 on the table 17 of FIG. 1 or along the rail 24 of FIG. 2.

Figure 4:
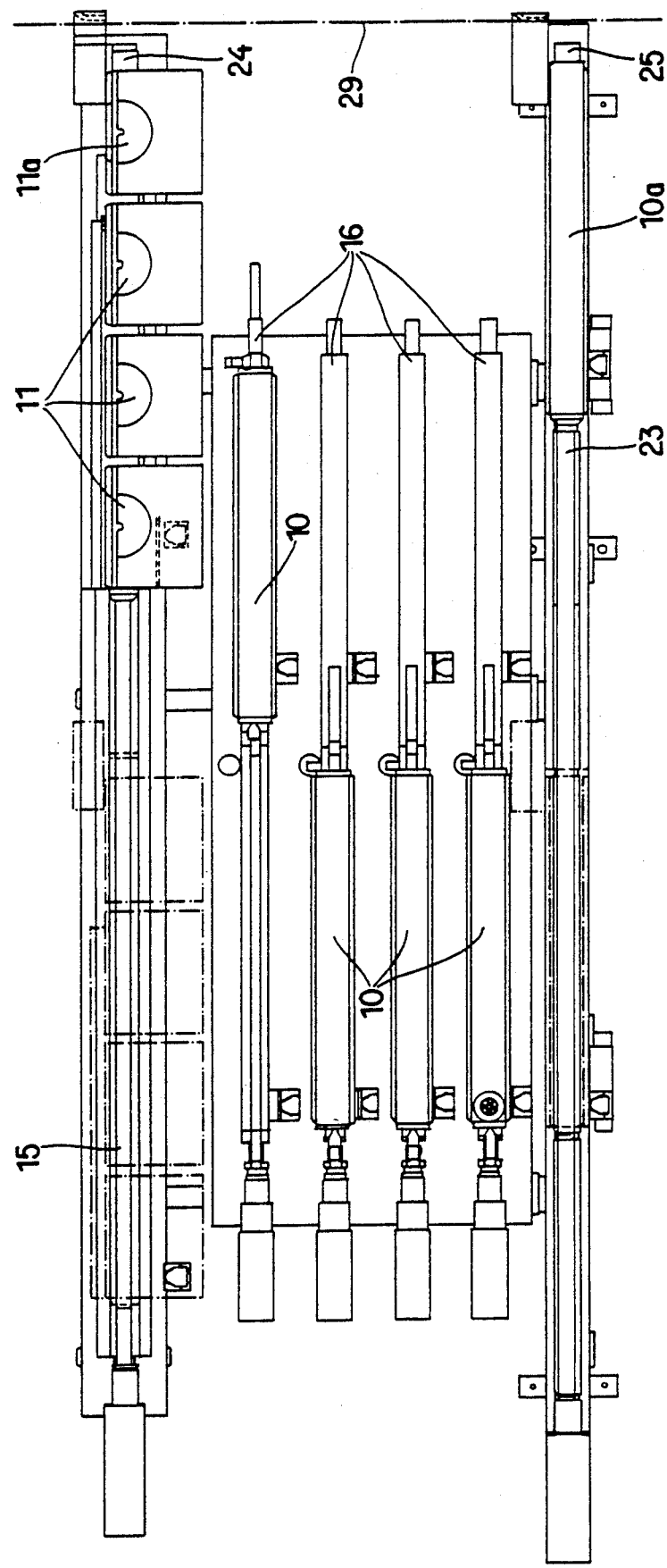
FIG. 4 is an enlarged plan view of a detail in the machine of FIG. 2.

FIG. 4 is a top plan view of certain details in the machining center of FIG. 3, and more specifically of the magazine 3 or 4 in the machine 2. The sections or racks 10, 10a of the magazine 3 are movable back and forth along the respective rails 16 and 25. The extent of movability of the sections 10 along the rails 16 is limited. The outermost rail 25 is longer than the neighboring rails 16 so that it can guide the section 10a thereon all the way to the entrailing plane 29 (shown in the rightmost portion of FIG. 4) of the carriage 13. A section 10a which has arrived at the plane 29 can be pushed or pulled onto the carriage 13 for transport to the station 28 where such section receives one or more different tools T. Analogously, the foremost container 11a in the magazine 4 of FIG. 2 can be advanced along the rail 24 to reach the plane 29 in order to be transported (by the carriage 13) to the station 28 where the respective adapter A is replaced with a different adapter.

The manner of transporting sections 10a from the magazine 3 of the machine 1 is analogous to the just described mode of transporting sections 10a from the magazine 3 of FIG. 2 except that the table 17 must be moved to a position of alignment with the selected rail 16 in the magazine 3 of FIG. 1 in order to enable a selected section 10a to advance to the station 28 where it can receive one or more different tools T prior to being returned into the magazine 3 of the machine 1.

It will be seen that a single transporting unit 8 suffices to deliver workpieces 21 to and to remove workpieces from the stations ST1 and ST2. Furthermore, such single transporting unit can also perform the function of shuttling sections (10a, 11, 11a) of magazines 3, 4 in each of the machines 1, 2 between the magazines and the station 28. Still further, the unit 8 can be used to transfer sections 10a between the magazines 3 of the machines 1 and 2 and/or to transfer containers 11, 11a between the magazines 4 of the machines 1 and 2.

The manipulators 7 are used to shuttle tools T and adapters A between the magazines 3, 4 and the stations ST1, ST2 of the respective machines 1 and 2. On the other hand, the transporting unit 8 is used to move workpieces 21 to and from the stations ST1, ST2 as well as to transport sections of magazines 3, 4 in each of the machines 1, 2 between the respective magazines and the station 28, i.e., to a station other than the station ST1 or ST2.

The adapters 7 can further serve to transfer tools T between the sections 10, 10a of the respective magazines 3 and to transfer adapters A between the compartments 11 or 11a.

Figure 7:
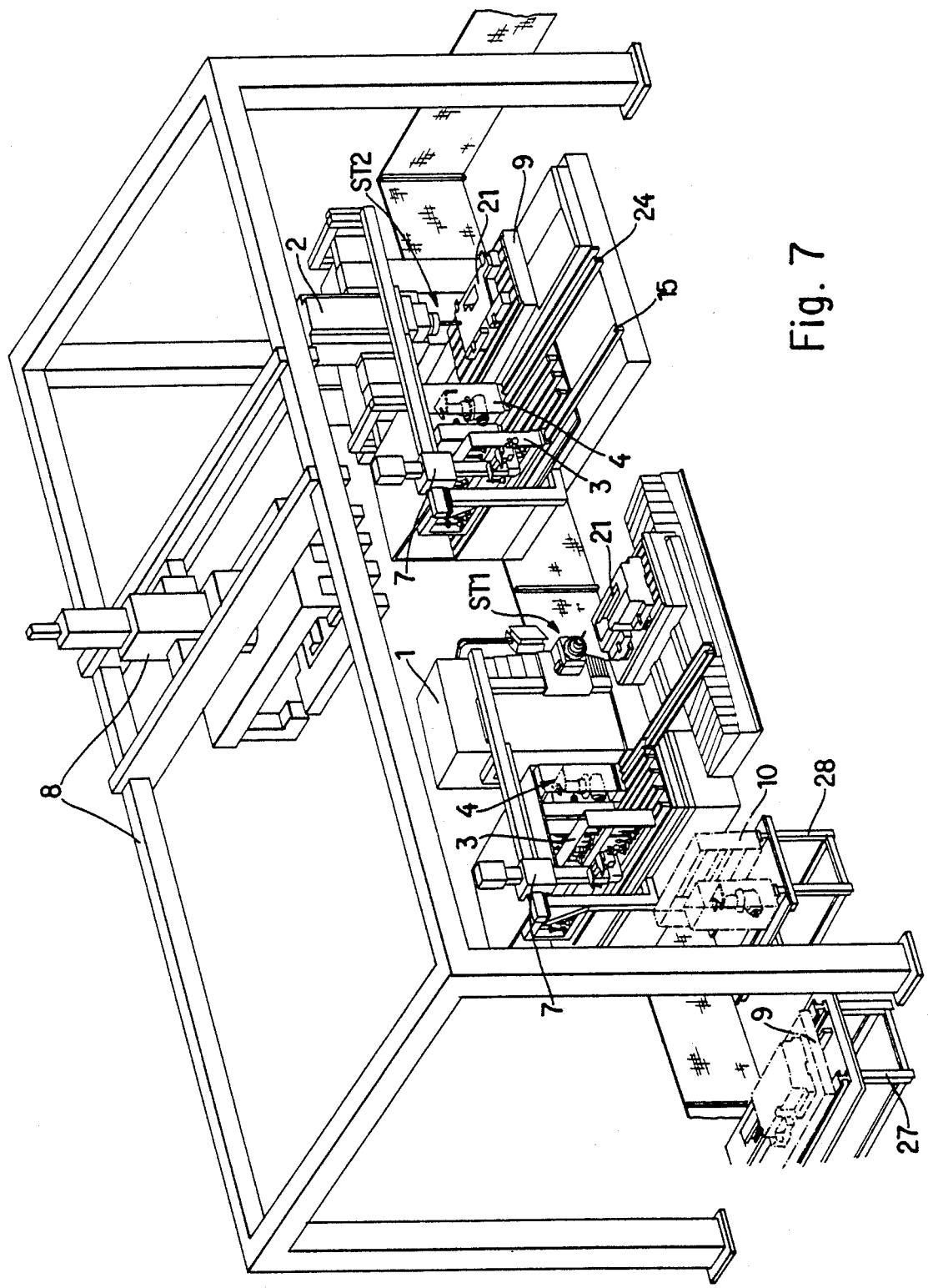
FIG. 7 is a perspective view similar to FIG. 3, with the transporting unit for workpieces, tool magazines, and adapter magazines arranged at a level above the spindles of the two machines.

The machining center of the present invention can employ two or more machines 1 with horizontal tool spindles 5 and/or two or more machines 2 with vertical tool spindles 6. Furthermore, the transporting unit 8 can be installed in front of, behind or above the material removing stations ST1 and ST2. FIG. 7 shows the transporting unit 8 installed above material removing stations ST1 and ST2.

An important advantage of the improved machining center is its flexibility and versatility. Thus, the transporting unit 8 can be installed in an area which is available in a machining center, and this transporting unit can perform a number of functions including manipulation of the workpieces 21, groups of tools T and groups of adapters A. The manipulation of workpieces 21 involves advancement of workpieces from the station 27 (or directly from a source of such workpieces) to the station ST1, thereupon (if necessary) from the station ST1 to the station ST2, and from the station ST2 to storage or to another destination after the treatment of successive workpieces 21 is completed.

Another important advantage of the improved machining center is that it can replace an entire battery of conventional machine tools. It has been found that the initial investment of the improved machining center is considerably less than the initial cost of a conventional production line which is set up to perform the same type of work. Additional savings are achieved in actual use of the improved machining center because its output is higher than that of conventional production lines. Furthermore, the space requirements of the improved machining center are a fraction of those of a standard production line for identical treatment of heavy or medium-heavy workpieces. The efficiency of the improved machining center is further increased if all operations of the moving parts are automated (e.g., numerically). This applies for the operation of the manipulators 7, for the operation of the transporting unit 8 as well as for operation of the means for delivering workpieces to the station 27 and the means for delivering fresh tools and/or adapters to the station 28 and for removing adapters and/or tools from this station. It has been found that the improved machining center need not be shut down except for the purposes of servicing and maintenance.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A machining center, particularly for removal of material from five sides of medium-sized and large workpieces, comprising a plurality of machines each having a material removing station with at least one tool spindle, at least one first mobile magazine for material removing tools and at least one second mobile magazine for tool adapters; at least one manipulator operable to shuttle tools and adapters between said magazines and the tool spindles at the respective stations; and a common multiple-function transporting unit for workpieces and said magazines.

2. The machining center of claim 1, wherein said machines include a first machine having a substantially horizontal tool spindle and a second machine having a substantially vertical tool spindle.

3. The machining center of claim 1, comprising a discrete manipulator for each of said machines.

4. The machining center of claim 1, wherein said unit comprises pallets for workpieces and for said magazines, and tracks for said pallets.

5. The machining center of claim 1, wherein one of said machines is a portal type machine.

6. The machining center of claim 1, wherein said first magazines are adjacent the respective stations and each first magazine includes a plurality of sections which are movable relative to each other and include an outer section remotest from the respective station, said unit including means for transporting the remotest sections of said first magazines.

7. The machining center of claim 6, wherein said outer sections are movable to and from positions of rest in the respective machines through first distances and each other section of each first magazine is movable to and from a position of rest in the respective machine through a lesser second distance.

8. The machining center of claim 1, wherein each of said second magazines is disposed between the respective first magazine and the respective station.

9. The machining center of claim 8, wherein each of said second magazines comprises a plurality of containers including a foremost container and at least one additional container, each of said foremost containers being movable in the respective machine to and from a position of rest through a first distance and each additional container being movable in the respective machine to and from a position of rest through a lesser second distance.

10. The machining center of claim 1, wherein said unit is disposed in front of said stations.

11. The machining center of claim 1, wherein said unit is disposed behind said stations.

12. The machining center of claim 1, wherein said unit is located above said stations.

13. The machining center of claim 1, wherein said unit includes a plurality of elongated guide rails, at least one carriage movable along said rails, and means for advancing workpieces and said magazines to and from said carriage.

14. The machining center of claim 13, further comprising numerically controlled regulating means for said advancing means.

15. The machining center of claim 1, wherein said machines include a plurality of machines having horizontal tool spindles at the respective stations.

16. The machining center of claim 1, wherein said machines include a plurality of machines having vertical tool spindles at the respective stations.

* * * * *